Patented Feb. 2, 1926.

1,571,829

UNITED STATES PATENT OFFICE.

CARL T. WIESE, OF SAND POINT, IDAHO, ASSIGNOR TO VAPO PRODUCTS COMPANY, INC., OF SAND POINT, IDAHO, A CORPORATION OF IDAHO.

DETERGENT COMPOSITION.

No Drawing. Application filed October 9, 1922. Serial No. 593,418.

*To all whom it may concern:*

Be it known that I, CARL T. WIESE, a citizen of the United States, residing at Sand Point, in the county of Bonner and State of Idaho, have invented certain new and useful Improvements in Detergent Composition, of which the following is a specification.

This invention relates to a detergent composition, designed primarily for use in cleaning dyed fabrics, carpets, rugs and upholstered articles, but it is to be understood however, that the composition can be employed for any purposes for which it is found applicable, and the invention has for its object to provide, in a manner as hereinafter set forth, a saponaceous composition embodying a thorough and quick cleansing characteristic without causing, when used, any injurious effect on the article to which it is applied to clean.

A further object of the invention is to provide a detergent composition, in a manner as hereinafter set forth, which is especially designed to be applied upon the surface of dyed fabrics, and its action is such as to saponified grease materials present in the fabric, thus releasing dirt particles held in suspension by said grease materials and further drive off the dirt and grease contained in the fabric in the form of vapor; the fabric to be cleaned is then agitated, by a rubbing action applied thereto, providing a lather which evaporates carrying off the dirt in the form of vapor. The composition when applied, in the manner as stated, not only thoroughly cleanses the fabric, but further restores the colors thereof, as well as not having any injurious effects whatsoever thereon. The cleaning of the article is attained by action only on that side thereof to which the composition is applied, under such conditions overcoming the inconveniences of reversing the article, if a large body, during the cleaning operation.

The invention further aims to provide a detergent composition in a manner as hereinafter set forth, for the cleaning of all dyed fabrics from the surface, and further provides a more satisfactory means for the purpose intended than that obtained by the employment of soaps, gasoline, benzine, ether and alcohol, and furthermore, when used is unusually economical and safe as well as labor saving.

A detergent composition, in accordance with this invention, is formed of the following ingredients:—

Saponified cotton seed oil, phenolphthalein, sassafras bark, Quillaja, soap bark, fuller's earth, hypo-sulphite sodium, salicylate sodium, borax, water.

The preferred proportions of the ingredients embodied is as follows:—

Saponified cotton seed oil 19 pounds; phenolphthalein, ½ ounce; sassafras bark, 1 pound; Quillaja, soap bark, 8 ounces; fuller's earth, 2 ounces; hypo-sulphite sodium, 1 pound; salicylate sodium, 1 ounce; borax, 5 pounds.

The saponified cotton seed oil forms the base of the composition, which is a soap base, and the manner of saponifying the cotton seed oil is had by dissolving 19 pounds of cotton seed oil in 2½ gallons of water and adding thereto, 2½ pounds of caustic soda which thoroughly saponfies the cotton seed oil and supplies the soap base of the composition, which is formed from the saponified cotton seed oil.

The manner of compounding a detergent composition, in accordance with this invention, consists first in taking the required quantity of saponified cotton seed oil, by way of example, 19 pounds, and admixing therewith 2½ gallons of water, and which is heated to a boiling point, and after reaching such point, there is added thereto, ½ ounce of phenolphthalein.

The sassafras and Quillaja bark, in the proportions required, by way of example, 1 pound of sassafras bark and 8 ounces of Quillaja bark are boiled together in 2½ gallons of water, and after brought to a boiling point, the barks are removed and to the remaining solution is added 2 ounces of fuller's earth admixed with 1 quart of water.

The sodium hypo-sulphite (properly called thiosulfate) and salicylate sodium, by way of example, 1 pound of the former and 1 ounce of the latter are dissolved in 1 quart of water and which is added and thoroughly admixed with the bark solution, and after the solution of these sodium salts has been thoroughly mixed with the bark solution, the borax by way of example, 5 pounds is then added to the bark-sodium solution.

The bark-sodium solution is then added to the soap base, the latter formed from the saponified cotton seed oil, and the base and the solution will when thoroughly mixed together provide a detergent composition which is then de-hydrated, and the resulting product is ground and provides the detergent composition, in accordance with this invention.

The fuller's earth is employed as a filler, the sodium salts as a color setter and also as a bleacher, the borax to neutralize the lyes, the aqueous extract of sassafras bark provides a solvent and a color brightening action and further a lather which readily evaporates, carrying off dirt therewith, and the phenolphthalein is employed as a color for the composition.

The detergent composition as herein set forth, provides a cleansing medium which when applied to dyed fabrics, carpets, rugs, will not only thoroughly clean the same, but restore the colors thereof, as well as not injuring them in any manner, and although the proportions herein specified with respect to the ingredients of the composition are the preferred ones to be used, yet it is to be understood that changes can be made in any one of the proportions set forth, without departing from the spirit of the invention.

What I claim is:—

A detergent composition formed from a de-hydrated compound consisting of a soap base formed from 19 pounds of saponified cotton seed oil admixed with 2½ gallons of water, a sassafras and soap bark solution derived from admixing 1 pound of sassafras bark and 8 ounces of soap bark and 2½ gallons of water, fuller's earth to which is added 1 quart of water, hypo-sulphite sodium and salicylate sodium dissolved in 1 quart of water and 5 pounds of borax.

In testimony whereof, I affix my signature hereto.

CARL T. WIESE.